Apr. 3, 1923.

J. G. ANDERSON

PROCESS OF MAKING RESILIENT SPLIT RINGS

Filed Mar. 5, 1921

1,450,346

Inventor
James G. Anderson
By Roberts, Roberts, & Cushman
his Attorneys

Patented Apr. 3, 1923.

1,450,346

UNITED STATES PATENT OFFICE.

JAMES G. ANDERSON, OF NEEDHAM, MASSACHUSETTS, ASSIGNOR TO PRESSURE PROOF PISTON RING COMPANY, OF BOSTON, MASSACHUSETTS, A CORPORATION OF MASSACHUSETTS.

PROCESS OF MAKING RESILIENT SPLIT RINGS.

Application filed March 5, 1921. Serial No. 449,925.

*To all whom it may concern:*

Be it known that I, JAMES G. ANDERSON, a citizen of the United States of America, and resident of Needham, in the county of Norfolk and State of Massachusetts, have invented new and useful Improvements in Processes of Making Resilient Split Rings, of which the following is a specification.

This invention relates to split resilient rings and to a process of making the same and is particularly addressed to rings useful in connection with the packing of pistons of internal combustion engines and the like and to the process of making such rings.

Rings of the character to which the invention relates and which may for example be employed as the "snap" packing rings commonly used in piston grooves, or which may be of the type used behind a packing ring for expanding the latter, are required to possess a resilient tendency to expand whereby to increase their effective diameters. When in use, however, such rings must closely approach a true circle in order to conform to the piston and cylinder with which they cooperate and in order that there may be no cutting or scoring of the cylinder as the piston slides therein. In the making of such rings heretofore, difficulty has been experienced in obtaining the desired configuration while at the same time securing the peripherally uniform resiliency requisite to the proper functioning of the ring.

One object of the present invention is to furnish a resiliently expansible split ring which tends to expand with a substantially uniform radial component of outward pressure at all points of its periphery when its ends are brought adjacent to one another; that is to say when the ring has been constrained to assume a substantially circular form.

A further object of the invention is to provide a simple and practical process whereby rings of the desired shape and resiliency may be produced rapidly and with great accuracy and uniformity and without the employment of highly skilled or specially trained workers.

One mode of attaining these objects is shown in the accompanying drawings in which the various steps in the process of making a piston packing expander ring are illustrated, by way of example, and in which drawings,—

Figure 1:
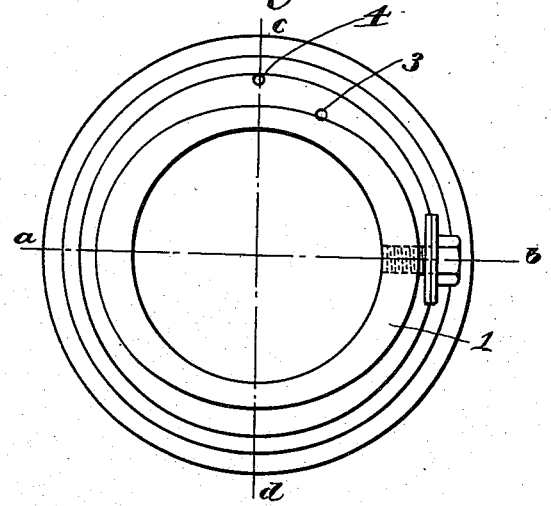
Figure 1 is an end view of a mandrel of a type employed in the practice of the present invention.
Figure 2:
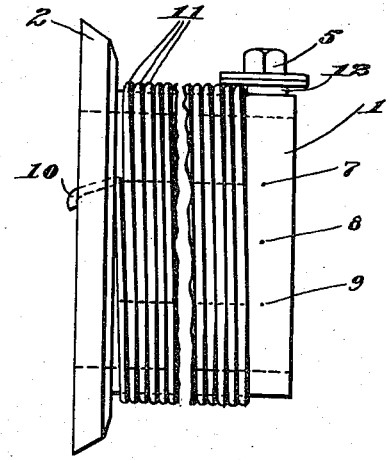
Fig. 2 is a plan view of such mandrel (turned at right angles to its position in Fig. 1) as it appears at an intermediate stage in the process, the central portion being broken out.

In the production of a ring in accordance with the present invention it is found convenient to employ a mandrel of any suitable length such as illustrated in Figs. 1 and 2, such mandrel comprising a tubular portion 1 of which the exterior is substantially elliptical in cross section and provided at one end with a radial flange 2. In Fig. 1 the major diameter of the elliptical portion is indicated by the line $a, b$, while the shorter diameter is indicated by the line $c, d$. Through the flange 2 may be formed one or more openings 3, 4 of different diameters to accommodate wires of different sizes and near the other extremity of the mandrel there is arranged a set screw 5 threaded into an opening in the mandrel. Upon the surface of the mandrel near its extremity, and a short distance on either side of the plane of the shorter diameter $c—d$, thereof, may be arranged indications such as the prick punch marks 7, 9. If desired a mark 8 may also be placed between the marks 7, 9, and substantially in the line of the shorter diameter of the ellipse.

In the employment of this device in accordance with the present process, one end of a length of wire of the desired cross section is passed through one of the openings 3 or 4, and securely fastened therein by bending or clenching the end as shown at 10. The wire is then wound in a close helical coil upon the mandrel thereby forming a series of substantially elliptical turns 11. The other extremity of the length of wire is then passed around the set screw 5 which is screwed down to clamp the wire and hold the same in position during the tempering process which ensues.

The wire while wound upon the mandrel is tempered in any desired manner, as for example by heating the same and quenching it in oil or other suitable medium.

Figure 3:
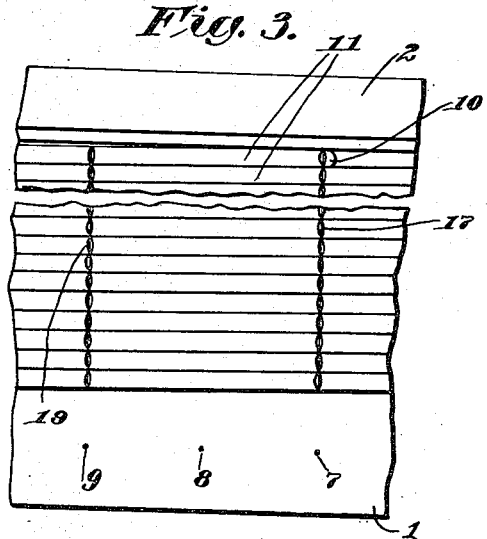
Fig. 3 is an enlarged, fragmentary view of the central portion of the device of Fig. 2, at a later stage in the process.
Figure 4:
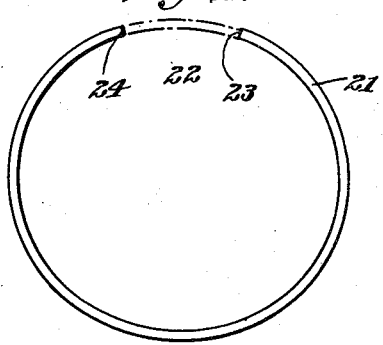
Fig. 4 is a plan view of a completed ring, indicating in broken lines a portion removed during the process.

After the tempering of the wire each turn may be notched in any suitable manner, in line with the indication marks 7 and 9, respectively, such notching being indicated at 17, 19, Fig. 3. After the turns of wire have been suitably marked in this manner, the entire coil may be removed from the mandrel by removing the said screw 5, releasing the clenched end 10, and drawing off the coil from the end of the mandrel. If difficulty is experienced in removing the coil in this manner, each turn may be severed, preferably along a line central between the notches 17, 19, the position of such line being conveniently indicated by the mark 8 upon the mandrel. After the removal of the coil or the individual turns from the mandrel, the portion of each turn lying between the notches 17, 19, is cut away, whereby the turns are brought to the form indicated in Fig. 4 at 21. In this case the removed portion is indicated in broken lines at 22 and the ring 21 is shown as terminating at the points 23, 24 spaced some distance apart. The open ring thus produced is of substantially elliptical form, the opening therein being symmetrical with its shorter diameter. After the severing of the portion 22 from the turn of wire, as indicated in Fig. 4, such turn, which forms an element of a helix, may if deemed necessary be brought to lie substantially in a plane by subjecting it to a pressing or other suitable operation. This however, is in most cases unnecessary since the coils as removed from the mandrel sufficiently approximate to a plane for ordinary purposes.

Figure 5:
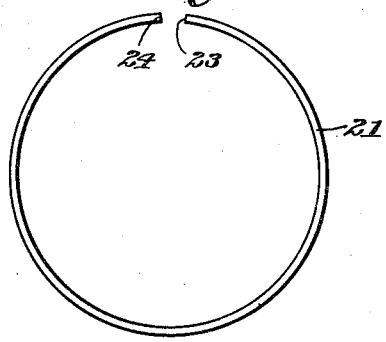
Fig. 5 is a view similar to Fig. 4, but illustrating substantially the form the ring assumes in use.

In the use of rings formed in accordance with this process, a ring 21 may be placed within a groove such as 31 in a piston 30, such piston sliding within a cylinder indicated at 29. If desired a piston ring 28 may be placed in the groove, such ring having a beveled surface at 22 against which the ring 21 may press. When in proper position within the piston groove the ring 21 will assume the substantially circular form indicated in Fig. 5 wherein its ends 23, 24, closely approach one another. By forming the ring upon a mandrel of substantially elliptical cross section, the ring when in use is enabled to assume a substantially circular form such as is desirable for its best operation. The open elliptical ring when constrained to assume a substantially circular form in the piston groove is found to press outwardly against adjacent parts with substantially equal force in all directions and thus there is no appreciable tendency to wear or score the cylinder walls unequally.

Although the ring 21 has been shown as an expander ring for expanding the usual piston ring, it is clearly evident that a piston packing ring such as 28 might be formed in a similar manner and it is contemplated that it is within the scope of the present invention to form piston packing rings in this way.

Figures 7, 9:
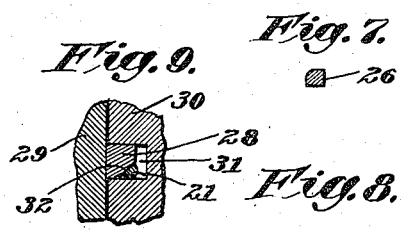
Figs. 6, 7 and 8 are views illustrating in cross section various shapes of wire or bar from which rings may be made in accordance with the present invention.
Fig. 9 illustrates in cross section a ring of one type, which may be made in accordance with this invention, positioned for use.
Figure 6:
Figure 8:

While the wire for forming the ring-like member 21 has been indicated as of section such as shown at 25 in Fig. 6 it is clear that wire of other cross section might be employed, as for example a substantially square wire such as shown at 26 in Fig. 7 or a wire of oblong rectangular section such as shown at 27 in Fig. 8. Wire of the latter cross section might well be employed for forming snap rings of ordinary form such as are commonly employed in the grooves of internal combustion engine pistons. It is also evident that the invention might be employed in other cases wherein it is desired to provide resilient expansible rings of substantially circular form when under compression. It is furthermore to be understood that while the above order of steps in performing the process is regarded as desirable it is within the spirit of the invention to vary such order as circumstances may direct and while a mandrel of substantially elliptical cross section has been described as of especial value in the carrying into effect of this invention it is to be understood that a mandrel of other cross section might well be found to give satisfactory results.

Having thus described the invention and the mode of practising the same, what I claim and desire to secure by Letters Patent of the United States is:—

1. That process which comprises removing a short section from a turn of a helical coil of tempered wire by spaced cuts whereby to cause the remainder of such turn to assume the form of an open compressible ring.

2. That process of simultaneously forming a plurality of split rings which comprises removing a predetermined short section from each of the successive coils of a helix of tempered wire by spaced cuts extending axially of the helix.

3. That process of forming expansible rings which comprises wrapping a length of wire about a suitably formed mandrel, tempering the wire while on the mandrel, and severing from said length of wire a portion proper to constitute a ring.

4. That process of forming expansible rings which comprises winding a length of wire about a mandrel of proper contour and tempering the wire while on the mandrel.

5. That process of forming split rings which comprises winding a length of wire about a mandrel of non-circular cross section, tempering the wire upon the mandrel and cutting from the shaped length thus formed a portion proper to constitute a split ring of desired dimensions.

6. The process of forming expansible split rings which comprises winding a length of wire upon a mandrel of generally elliptical section to form a helix of a series of turns, tempering such helix while on the mandrel, marking each turn at a point at each side of one end of a minor diameter of the elliptical coil, removing the coil from the mandrel and removing the marked section from each turn of the helix.

7. That process of forming an expansible ring comprising wrapping a length of wire about a generally curvilinear mandrel having a flattened side, and thereafter severing a section from such length of wire at that portion thereof which engages the flattened side of the mandrel.

8. That process of forming expansible rings comprising winding a close helix of wire upon a mandrel of substantially elliptical form, tempering the wire while on the mandrel, marking successive turns of said coil at equidistant points on each side of one end of a minor diameter of the coil, removing the coil from the mandrel, and cutting the several turns at the points of marking thereof.

Signed by me at Boston, Massachusetts, this first day of March, 1921.

JAMES G. ANDERSON.